(12) United States Patent
Wolf

(10) Patent No.: US 12,512,666 B2
(45) Date of Patent: Dec. 30, 2025

(54) CIRCUIT ARRANGEMENT FOR CURRENT LIMITING AND ELECTRICAL SYSTEM

(71) Applicant: Robert Bosch GmbH, Stuttgart (DE)

(72) Inventor: Mathis Wolf, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 18/313,653

(22) Filed: May 8, 2023

(65) Prior Publication Data
US 2023/0369845 A1    Nov. 16, 2023

(30) Foreign Application Priority Data

May 11, 2022   (DE) ..................... 10 2022 204 609.9

(51) Int. Cl.
*H02H 9/02*     (2006.01)
*B60L 3/00*     (2019.01)

(52) U.S. Cl.
CPC ............... *H02H 9/02* (2013.01); *B60L 3/003* (2013.01)

(58) Field of Classification Search
CPC .. H02H 9/02; H02H 9/025; B60L 3/00; B60L 3/003; B60L 3/04
USPC .................................................... 361/86–87
See application file for complete search history.

(56) References Cited

U.S. PATENT DOCUMENTS

| | | | | |
|---|---|---|---|---|
| 4,438,473 A | * | 3/1984 | Cawley | G05F 1/569 361/74 |
| 5,181,155 A | * | 1/1993 | Beg | H02H 3/08 361/87 |
| 2011/0267842 A1 | * | 11/2011 | Archer | H02M 3/33592 363/16 |
| 2017/0005570 A1 | * | 1/2017 | Nakashima | H02M 7/5387 |
| 2023/0188041 A1 | * | 6/2023 | Lanneluc | G01R 19/12 323/284 |

FOREIGN PATENT DOCUMENTS

| | | |
|---|---|---|
| DE | 10355964 A1 | 6/2005 |
| DE | 102017123644 A1 | 4/2018 |
| DE | 102019202163 A1 | 8/2020 |
| WO | 2010051836 A1 | 5/2010 |

* cited by examiner

*Primary Examiner* — Danny Nguyen
(74) *Attorney, Agent, or Firm* — Michael Best & Friedrich LLP

(57) ABSTRACT

A circuit arrangement for current limiting and an electrical system comprising such a circuit arrangement. An output terminal of a current limiting control circuit is connected to a control input of a semiconductor switch via a limiting resistor (RB). The current limiting control circuit is configured to change an output impedance of the current limiting control circuit at the output terminal. The semiconductor switch is configured to set a current (I) in a circuit between an electrical power source and a load. An inductor (L) is configured to be connected to the electrical power source and to a terminal of the load and an input of the current limiting control circuit is connected to the inductor (L). The current limiting control circuit is configured to detect an overcurrent-related voltage drop (VL) of the inductor (L) and reduce its output impedance to increase an output impedance of the semiconductor switch.

14 Claims, 2 Drawing Sheets

CIRCUIT ARRANGEMENT FOR CURRENT LIMITING AND ELECTRICAL SYSTEM

BACKGROUND

The present invention relates to a circuit arrangement for current limiting and an electrical system comprising such a circuit arrangement.

Electrical systems, such as drive trains of battery-electrically powered vehicles, in which error states, in particular low-impedance short circuits, are determined and in which suitable measures are implemented to limit and/or prevent damage to components of the electrical systems in the event of an error, are known from the prior art.

In battery-electrically powered vehicles in particular, it is important to prevent an electrical short circuit, for example in a circuit between a traction battery and an inverter, in the millisecond range. The traditional approach here is to monitor a voltage across a shunt by means of an electronic measuring system in order to activate a pyrotechnic battery disconnect system (pyrofuse) when a specific voltage is exceeded, so that a circuit having the short circuit is interrupted.

DE 102019202163 A1 describes a device and a method for shutting down a battery cell in a battery system of a vehicle in the event of an electrical short circuit. A measurement element is used to produce a measurement voltage based on an amperage gradient. The short circuit is detected via an analog circuit connected to the measurement element, wherein the analog circuit activates a switch to interrupt the current flow.

SUMMARY

According to a first aspect of the present invention, a circuit arrangement for current limiting is proposed, which can advantageously be used in a battery-electrically powered vehicle, for example to protect a traction battery and/or other components, in particular a drive train of a vehicle, from damage in the event of the occurrence of an overcurrent. It should be noted that the circuit arrangement according to the invention is not limited to such an area of application and can in principle be used advantageously in any electrical system.

The circuit arrangement comprises an inductor, a limiting resistor, a gate resistor, a gate driver, a current limiting control circuit and a semiconductor switch, wherein an output terminal of the current limiting control circuit is connected via the limiting resistor to a control input (usually a gate terminal) of the semiconductor switch. The limiting resistor is configured, for example, as a separate component and/or as an intrinsic output resistor of the circuit arrangement and/or as an electrical connection of the output terminal of the current limiting control circuit to the control input of the semiconductor switch and/or is formed discretely and/or integrally.

The current limiting control circuit is configured to change an output impedance of the current limiting control circuit at the output terminal in order to thereby control the semiconductor switch.

The gate driver is connected via the gate resistor to the control input of the semiconductor switch and thereby also to the limiting resistor, and is configured to control the semiconductor switch to open and close (closing explicitly also includes possible control states between complete closing and complete opening of the semiconductor switch). In other words, the gate resistor and the limiting resistor form a voltage divider, which is set as a function of the output impedance of the current limiting control circuit.

The semiconductor switch is configured to set a current in a circuit between an electrical power source (hereinafter also referred to in short as a "power source") and an electrical load (hereinafter referred to in short as a "load") as a function of a control by the current limiting control circuit. For this purpose, a load path of the semiconductor switch (usually a channel between a source and a drain terminal of the semiconductor switch) is connected in series between the power source and the load.

The inductor is configured to be directly or indirectly connected to a terminal of the electrical power source via a first terminal (e.g. via further components such as switches, lines, etc.) and directly or indirectly connected to a terminal of the load. via a second terminal via a second terminal (e.g. via further components such as switches, lines, etc.).

A first input terminal of the current limiting control circuit is electrically connected to the first terminal of the inductor and a second input terminal of the current limiting control circuit is electrically connected to the second terminal of the inductor, so that a voltage drop across the inductor, which is caused by an overcurrent-related current gradient in the circuit formed by the power source and the load, is present at the input of the current limiting control circuit.

The current limiting control circuit is thus configured to detect the overcurrent-related voltage drop across the inductor and in response reduce its output impedance in order to thus increase an output impedance of the semiconductor switch on the basis of a voltage drop across the limiting resistor, so that the increased output impedance in the semiconductor switch counteracts the overcurrent.

An overcurrent-related voltage drop can in particular be understood to be a voltage drop caused by a short circuit in the circuit. Alternatively or additionally, the overcurrent-related voltage drop can more generally be understood to be a voltage drop caused by a current gradient in the circuit that exceeds a predefined permissible current gradient for the circuit. The circuit arrangement according to the invention can be designed in such a way that an occurring short circuit is counteracted by the circuit arrangement at a very early stage at which a current gradient characteristic of the short circuit is reached, for example, as a result of which especially quick short circuit countermeasures can be implemented.

In addition to the especially quick detection and quick handling of an overcurrent, the circuit arrangement according to the invention provides, among other things, the advantages that components within the circuit in which the circuit arrangement is being used can be reliably protected from damage by an overcurrent. It also provides the advantage that, by suitably defining electrical parameters of the circuit arrangement, a power supply of the load and/or other loads in the circuit can be resumed automatically as soon as the overcurrent-related current gradient subsides. Such a case is conceivable, for example, if the overcurrent is caused by a time-limited interference pulse coupled into the circuit and/or similar temporarily occurring events. This makes it possible to increase the availability of components of the circuit, which can be advantageous in particular when the circuit arrangement according to the invention is used in connection with a monitoring of a drive train of a battery-electrically powered vehicle.

In an advantageous embodiment of the present invention, the semiconductor switch is a power semiconductor switch, alternatively or additionally a MOSFET, an IGBT, or a JFET, and further alternatively or additionally a Si, a SiC, or a GaN-based semiconductor switch. It is also possible that the semiconductor switch is a topological semiconductor switch formed of a plurality (e.g. two, three, four or more) parallel-connected individual semiconductor switches. The latter can be used advantageously in particular when high currents are to be switched and/or reduced by means of the semiconductor switch. The current-limiting circuit is particularly advantageously configured as an analog circuit, because this enables an especially quick reaction of the circuit arrangement according to the invention to an existing overcurrent.

The inductor is preferably a parasitic inductor and/or a discrete component and/or a coil and/or a transformer. Alternatively or additionally, the inductor is an inductor of a shunt resistor and/or a line and/or a line section of the circuit and/or a busbar and/or a conductor track of a printed circuit board. In particular in the case in which the inductor is a parasitic inductor of an already existing component of the circuit, an especially cost-efficient and simple implementation of the circuit arrangement according to the invention can be achieved. The parasitic inductor of a shunt element can be defined precisely by the geometric dimensions of the shunt element, for instance. It is also possible to set a suitable value for the inductor required according to the invention in a flexible manner by means of one or more additionally added taps on an existing component of the circuit (e.g. on said shunt element).

The circuit arrangement is advantageously configured to permanently maintain the overcurrent-related increased output impedance of the semiconductor switch (e.g. on the basis of a latch circuit), so that a reduction of the voltage drop across the inductor after an overcurrent-related current gradient does not lead to a full restart of the semiconductor switch, even though the cause of the overcurrent (e.g. a short circuit) is still present. Alternatively, it is possible to return the increased output impedance to an original value prior to the occurrence of the overcurrent after a predefined period of time when the voltage drop across the inductor is reduced. Among other things, this provides the advantage that briefly occurring overcurrents, which are caused by coupled interference pulses, for example, do not lead to a permanent reduction in the output impedance of the semiconductor switch. The predefined time period is advantageously defined as a function of an expected duration of potentially occurring interference pulses and/or some other type of overcurrent-causing events.

In a further advantageous configuration of the present invention, the circuit arrangement is configured to, prior to processing by the current limiting control circuit, subject a signal representing the voltage drop across the inductor to low-pass filtering by means of a low-pass filter, in particular by means of an RC low-pass filter, which is in particular designed to smooth or reduce interference signals acting on the circuit. The circuit arrangement further advantageously comprises a discharge resistor, which is connected in parallel with a capacitor of the RC low-pass filter and is defined as a function of a desired duration of the current limiting between the power source and the load. Further alternatively or additionally, a diode is connected between the second terminal of the inductor and the second input terminal of the current limiting control circuit, which on the one hand ensures that an overcurrent detection or overcurrent response by the current limiting control circuit takes place only when a positive current gradient is present and, on the other hand, is capable of filtering out small voltage drops (e.g. caused by interference pulses) across the inductor by its forward voltage, so that such voltage drops do not lead to a reduction of the load current in the circuit.

The circuit arrangement is preferably configured to completely prevent a current flow through the semiconductor switch if a predefined first voltage threshold is exceeded by the voltage drop across the inductor. This is accomplished by a shutdown circuit, for instance, the input of which is likewise connected to the terminals of the inductor and the output of which is directly connected to the control terminal of the semiconductor switch, so that the control input of the semiconductor switch is pulled in the direction of the source potential or preferably to the source potential of the semiconductor switch.

In a further advantageous configuration of the present invention, the limiting resistor is a linear and/or a non-linear limiting resistor and in particular a Zener diode. The use of a Zener diode has the advantage that the voltage divider consisting of the gate resistor and the limiting resistor does not have to be defined as a function of the specific configuration of the circuit arrangement, because the substantially constant voltage drop across the Zener diode (e.g. 6 V) is instead decisive for the control of the control input of the semiconductor switch. The current limiting control circuit is preferably configured on the basis of a bipolar transistor and/or on the basis of a MOSFET, the output impedance of which is adjusted in the event of an overcurrent by controlling a control input of the bipolar transistor or the MOSFET.

The circuit arrangement is further preferably configured to reduce the output impedance of the current limiting control circuit only when the voltage drop across the inductor exceeds a predefined second voltage threshold. This can be defined on the basis of the above-described diode, for instance, and/or on the basis of a forward voltage of a bipolar transistor that can be used to change the output impedance of the current limiting control circuit.

The electrical power source is a battery, for example, and in particular a drive battery for an electrically drivable vehicle. The battery is configured to provide a voltage in the range of 48 V to 1000 V and preferably between 200 V and 800 V, for example, without thereby creating a restriction to said voltage ranges. The load is preferably an inverter for a drive train of a vehicle and/or an air conditioning compressor and/or an electric heater and/or an on-board charger, etc. The use of the circuit arrangement according to the invention is moreover particularly advantageous when the load is connected in parallel with an intermediate circuit capacitor, by means of which an especially high current gradient is produced in the event of a short circuit in the load and/or in another part of the circuit, because an inductor of the battery in the event of a short circuit does not initially have a current-limiting effect.

According to a second aspect of the present invention, an electrical system is proposed, which comprises a circuit arrangement as described above, an electrical power source (e.g. a battery), a load (e.g. an inverter in connection with an electric motor), and a vehicle electrical system for a vehicle. The vehicle is a car, a truck, a bus, a rail vehicle or a two-wheeled vehicle, for instance. Among other things, the vehicle electrical system is configured to transmit electrical power from the electrical power source to the load. The circuit arrangement is configured to reduce a current between the load and the electrical power source by means of a control of the semiconductor switch if a current flowing through the vehicle electrical system corresponds to an overcurrent.

BRIEF DESCRIPTION OF THE DRAWINGS

Embodiment examples of the invention are described in detail in the following with reference to the accompanying drawing. The figures show.

DETAILED DESCRIPTION

Figure 1:
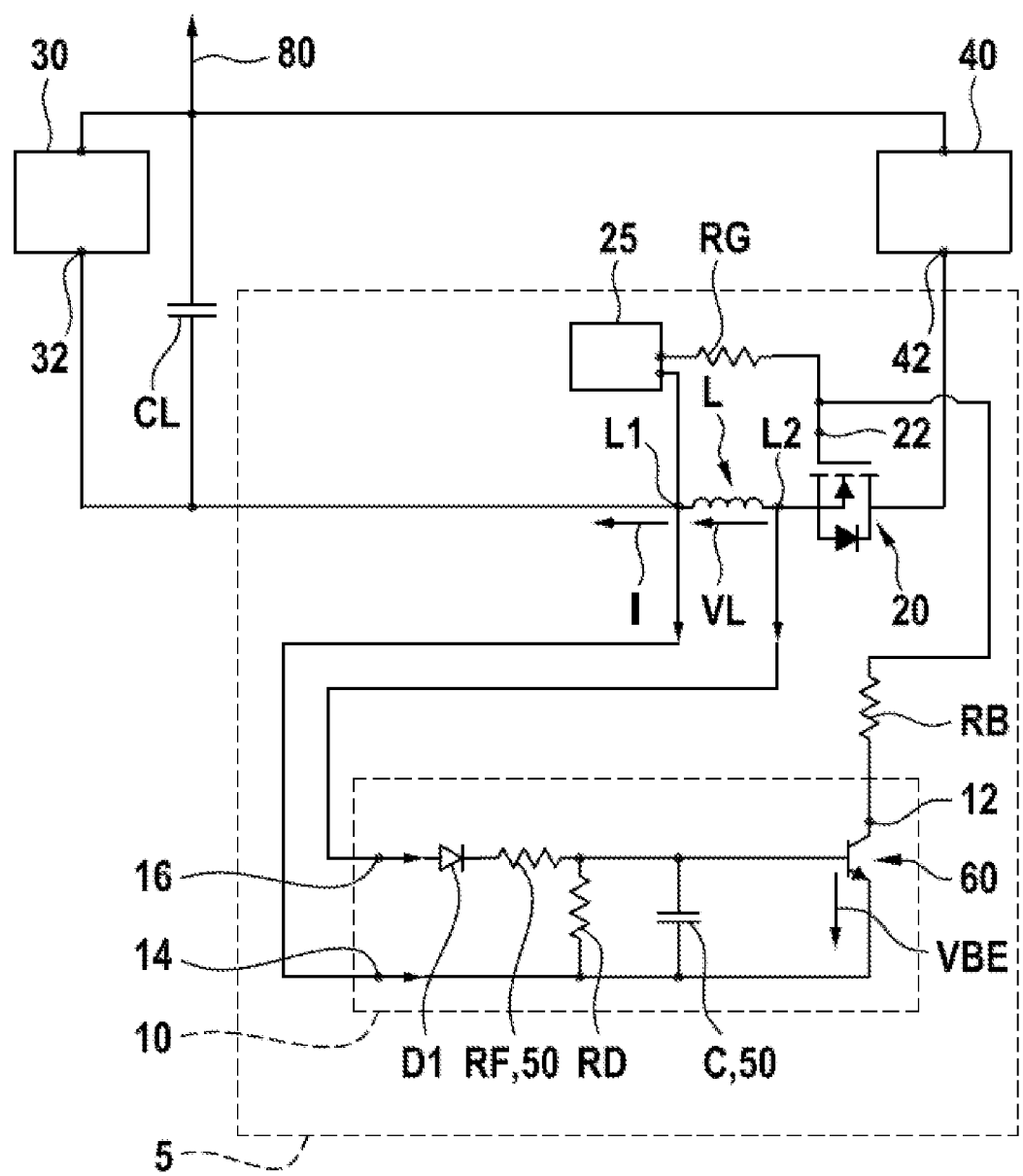
FIG. 1 a circuit diagram of an electrical system according to the invention comprising a circuit arrangement according to the invention for current limiting according to a first embodiment.

FIG. 1 shows a circuit diagram of an electrical system according to the invention comprising a circuit arrangement 5 according to the invention according to a first embodiment. The electrical system here is an electrical system of a drive train of a battery-electrically powered vehicle.

In addition to the circuit arrangement 5 for current limiting, the electrical system comprises an electrical power source configured as a battery 30 of a drive train of the vehicle, a load configured as an inverter 40 of the drive train, a capacitor CL connected in parallel with the inverter 40 and a vehicle electrical system 80 of the vehicle. The capacitor CL is provided for stabilizing a vehicle electrical system voltage, for example. Therefore, in the event of the occurrence of a short circuit in the inverter 40, the inverter is initially fed by the capacitor CL and not by the battery 30.

The circuit arrangement 5 comprises an inductor L, which is connected by means of a first terminal L1 to a terminal 32 of the battery 30 and is connected by means of a second terminal L2 via a MOSFET 20 (e.g. a SiC MOSFET), which can also be composed of a plurality of parallel-connected SiC MOSFETs 20, to a terminal 42 of the inverter 40. The inductor L here is a parasitic inductor L of a shunt resistor.

The inductor L is advantageously connected as close as possible (e.g. at a distance of a few millimeters to a few centimeters) to the source terminal of the MOSFET 20 in order to prevent an additional voltage drop at the gate terminal 22 of the MOSFET 20 via a leakage inductor between the source and a current limiting control circuit 10 of the circuit arrangement 5 according to the invention when high current gradients occur.

The circuit arrangement further comprises a gate driver 25, which is electrically connected via a gate resistor RG to the gate terminal 22 of the MOSFET 20 and to the limiting resistor RB, and is configured to control the MOSFET 20 to open and close. For short circuit monitoring according to the invention, it can therefore be assumed that the MOSFET 20 is controlled by the gate driver 25, during which the MOSFET 20 is closed so that a current I can flow between the battery 30 and the inverter 40.

The current limiting control circuit 10 is configured to change an output impedance of the current limiting control circuit 10 at an output terminal 12 of the current limiting control circuit 10 in order to control the MOSFET 20 independently of a current control of the MOSFET 20 by the gate driver 25. In other words, the current limiting control circuit 10 is configured to adjust a degree of activation of the MOSFET 20 even when a gate voltage for fully activating the MOSFET 20 (e.g. 18 V) is provided in parallel by the gate driver 25.

The current limiting control circuit 10 is connected to the first terminal L1 of the inductor L via a first input terminal 14 and is connected to the second terminal L2 of the inductor L via a second input terminal 16.

The respective forward voltages of a diode D1 and a bipolar transistor 60 of the current limiting control circuit 10 prevent smaller interference pulses from affecting the current limiting control circuit 10 by defining a second voltage threshold which must at least be reached by the voltage VL in order to carry out the current limiting according to the invention.

The diode D1 is further configured to dampen or prevent oscillations and to rectify the induced voltage VL, so that the short circuit detection works only in the discharge direction of the capacitor CL. Lastly, the output impedance of the current limiting control circuit 10 is set by using the bipolar transistor 60.

In the event of a low-impedance short circuit in this circuit, a voltage VL induced in the inductor L is present as an input variable at the input 14, 16 of the current limiting control circuit 10. The bipolar transistor 60, which conducts on account of the applied voltage VL, causes a corresponding reduction in the gate source voltage VGS at the MOSFET 20 via the resistor RB, for example from a voltage value of 18 V to a voltage value 6 V, as a result of which the current I in the circuit is limited to a desired current value.

A resistor RD and a current flow between the base and the emitter of the bipolar transistor 60 are used to define a period of time in which a gate source voltage VGS of the MOSFET 20 is reduced until the gate source voltage VGS increases again, for example to 18 V. A voltage drop produced by the current flow between the base and the emitter of the bipolar transistor 60 is characterized by means of the base-emitter voltage VBE.

The resistor RF and the capacitor C form a low-pass filter 50, which additionally effects a filtering of non-critical interference pulses.

It is conceivable to expand the circuit arrangement 5 by means of a latch circuit, which is configured to permanently keep the gate source voltage VGS of the MOSFET 20 at the limited current value after the occurrence of a short circuit.

Alternatively or additionally, it is possible to open the MOSFET 20 completely by means of an expansion of the circuit arrangement 5 after the lowering according to the invention of the current I as a result of a high current gradient in order to completely interrupt the circuit. The complete interruption is advantageously carried out when the voltage VL exceeds a first predefined voltage threshold.

It is also possible to replace the limiting resistor RB with a Zener diode in order to use a voltage specified by the Zener diode to control the gate of the MOSFET 20.

It should also be noted that the inductor L can alternatively be disposed in the branch between the battery 30 and the inverter 40, in which the MOSFET 20 in FIG. 1 is not disposed. It is also possible to dispose the MOSFET 20 in this other branch as well.

Figure 2:
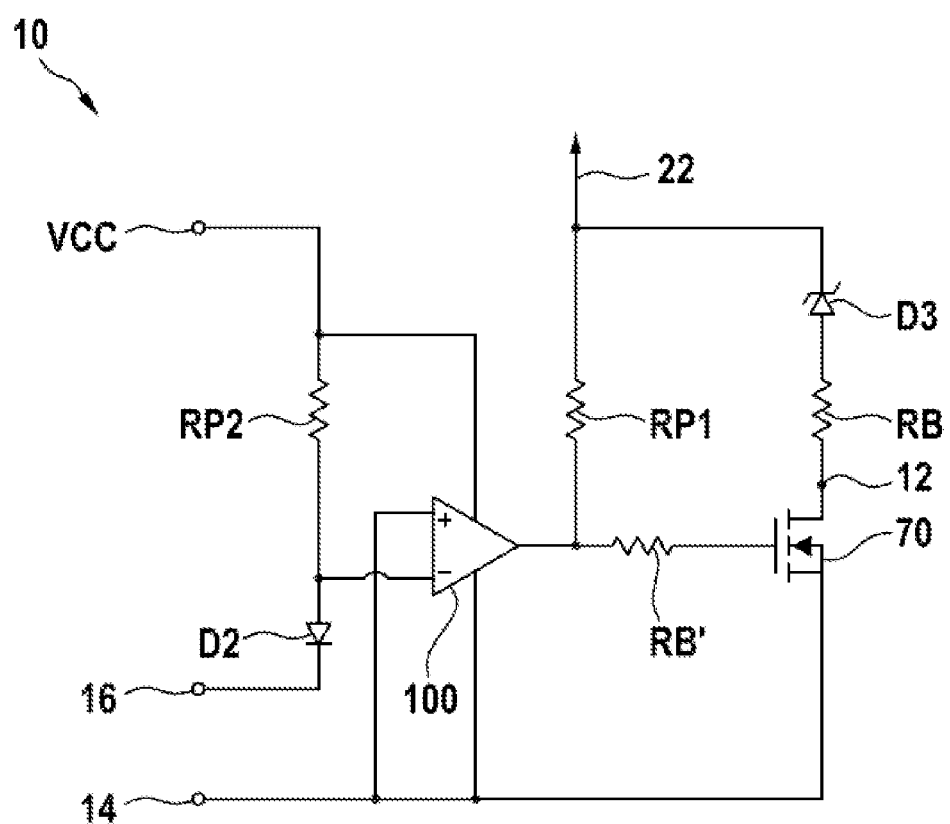
FIG. 2 a circuit diagram of a current limiting control circuit of a circuit arrangement according to the invention according to a second embodiment.

FIG. 2 shows a circuit diagram of a current limiting control circuit 10 of a circuit arrangement 5 according to the invention according to a second embodiment, wherein this current limiting control circuit 10 can in particular be used for short circuit detection and current limiting when the available inductor L is very low (e.g. 1 nH to 5 nH) and/or when current increases are low (e.g. 10 A/μs to 100 A/μs). It is also possible to use the current limiting control circuit 10 shown in FIG. 2 in parallel with the current limiting control circuit 10 shown in FIG. 1. The current limiting control circuit 10 shown in FIG. 1 reacts more quickly at high current gradients, while the current limiting control circuit 10 shown in FIG. 2 reacts comparatively more slowly, but more sensitively, i.e. already at lower current gradients.

It should be noted that the current limiting control circuit 10 according to the second embodiment can be used in the circuit arrangement 5 or the electrical system shown there as an alternative to the current limiting control circuit 10 according to the first embodiment (or also independently of this specific design), which is why, to avoid repetition, reference is made to the statements regarding FIG. 1 and only the differences to FIG. 1 are discussed in the following.

It should also be noted that, for better understanding, the current limiting control circuit 10 comprises at its output terminal 12 the components RB, D3, which, beyond the actual current limiting control circuit 10, are assigned to the superordinate circuit arrangement 5 according to the invention.

By means of the input terminals 14, 16, the present current limiting control circuit 10 is electrically connected, for example to the terminals L1, L2 of the inductor L of the circuit arrangement 5 shown in FIG. 1.

The current limiting control circuit 10 according to the second embodiment is supplied by means of a voltage supply VCC, which can be a voltage provided by the gate driver 25 in FIG. 1, for example. The voltage supply VCC advantageously provides a voltage value greater than 5 V.

A forward voltage of a diode D2 is used to preset a second voltage threshold for a comparator 100, which must be exceeded by the voltage VL in order to carry out the current limiting according to the invention. To adjust the second voltage threshold, it is conceivable, for example, to dispose one or more further diodes in series with the diode D2.

A gate source voltage of the semiconductor switch 20 shown in FIG. 1 is defined on the basis of the diode D3, which is configured here as a Zener diode, which accordingly leads to a current limiting of the circuit shown in FIG. 1 in the event of a short circuit.

Instead of a bipolar transistor 60 as in FIG. 1, here a MOSFET 70 is provided to adjust the output impedance of the current limiting control circuit 10, which is closed by the comparator 100 as soon as the second voltage threshold is exceeded by the voltage VL.

The current limiting resistors RP1, RP2, RB and RB' are provided as well.

An undefined control state of the MOSFET 70 can be prevented by means of the current limiting resistor RP1, wherein said resistor pulls the voltage up to the gate or supply voltage by means of a so-called pull-up resistor. It also limits the current when the comparator 100 pulls its output to ground.

The current limiting resistor RP2 pulls the negative input of the comparator 100 to a defined potential and also limits the current when the diode D2 becomes conductive.

The current limiting resistor RB, together with the gate resistor RG, limits the current through the MOSFET 70 and through the diode D3. It also prevents oscillations that can be caused by fast switching.

The current limiting resistor RB' limits the current in order to not produce high transient current spikes at the gate of the MOSFET 70 when the MOSFET 70 is switched.

The current limiting control circuit 10 according to the second embodiment can advantageously also be expanded by means of a (not depicted) inverting operational amplifier at the input of the comparator 100, as a result of which it is possible to set the second voltage threshold especially flexibly with low tolerances.

The invention claimed is:

1. A circuit arrangement (5) for current limiting, the circuit comprising:
    an inductor (L),
    a limiting resistor (RB),
    a gate resistor (RG),
    a current limiting control circuit (10),
    a semiconductor switch (20), and
    a gate driver (25),
    wherein
        an output terminal (12) of the current limiting control circuit (10) is connected to a control input (22) of the semiconductor switch (20) via the limiting resistor (RB), wherein the output terminal (12) is connected between the control input (22) of the semiconductor switch (20) and the gate resistor (RG),
        the gate driver (25) is connected via the gate resistor (RG) to the control input (22) of the semiconductor switch (20) and to the limiting resistor (RB) and is configured to control the semiconductor switch (20) to open and close,
        the current limiting control circuit (10) is configured to change an output impedance of the current limiting control circuit (10) at the output terminal (12) in order to control the semiconductor switch (20),
        the semiconductor switch (20) is configured to set a current (I) in a circuit between an electrical power source (30) and a load (40) as a function of a control by the current limiting control circuit (10),
        the inductor (L) is configured to be directly or indirectly connected to a terminal (32) of the electrical power source (30) via a first terminal (L1) and directly or indirectly connected to a terminal (42) of the load (40) via a second terminal (L2),
        a first input terminal (14) of the current limiting control circuit (10) is electrically connected to the first terminal (L1) of the inductor (L) and a second input terminal (16) of the current limiting control circuit (10) is electrically connected to the second terminal (L2) of the inductor (L), and
        the current limiting control circuit (10) is configured to detect an overcurrent-related voltage drop (VL) of the inductor (L) and in response reduce its output impedance in order to thus increase an output impedance of the semiconductor switch (20) on the basis of a voltage drop across the limiting resistor (RB), so that the increased output impedance in the semiconductor switch (20) counteracts the overcurrent; and
    wherein the circuit arrangement (5) is configured to return the increased output impedance to an original value prior to the occurrence of the overcurrent after a predefined period of time when the voltage drop (VL) across the inductor (L) is reduced.

2. The circuit arrangement (5) according to claim 1, wherein
    the semiconductor switch (20) is at least one selected from the group consisting of
    a power semiconductor switch,
    a MOSFET, an IGBT or a JFET,
    a Si, a SiC or a GaN-based semiconductor switch (20),
    a topological semiconductor switch (20) formed of a plurality of parallel connected individual semiconductor switches, and
    an analog circuit.

3. The circuit arrangement (5) according to claim 1, wherein the inductor (L) is at least one selected from the group consisting of
a parasitic inductor,
a discrete component,
a coil,
a shunt resistor,
a line section of the circuit,
a busbar,
a conductor track of a printed circuit board, and
a transformer.

4. The circuit arrangement (5) according to claim 1, wherein the circuit arrangement (5) is configured to
permanently maintain the increased output impedance of the semiconductor switch (20).

5. The circuit arrangement (5) according to claim 1, wherein
the circuit arrangement (5) comprises
a diode (D1) is connected between the second terminal (L2) of the inductor (L) and the second input terminal (16) of the current limiting control circuit (10).

6. The circuit arrangement (5) according to claim 1, wherein the circuit arrangement (5) is configured to completely prevent a current flow (I) through the semiconductor switch (10) if a predefined first voltage threshold is exceeded by the voltage drop (VL) across the inductor (L).

7. The circuit arrangement (5) according to claim 1, wherein
the limiting resistor (RB) is replaced with a Zener diode, and/or
the current limiting control circuit (10) is configured on the basis of a voltage of a transistor, the output impedance of which is adjusted in the event of an overcurrent.

8. The circuit arrangement (5) according to claim 6, wherein the circuit arrangement (5) is configured to reduce the output impedance of the current limiting control circuit (10) only when the voltage drop (VL) across the inductor (L) exceeds a predefined second voltage threshold.

9. The circuit arrangement (5) according to claim 1, wherein
the electrical power source (30) is a drive battery for an electrically driven vehicle, and/or the load (40) is an inverter for a drive train of a vehicle, and/or
the load (40) is connected in parallel with an intermediate circuit capacitor (CL).

10. An electrical system comprising
a circuit arrangement (5) according to claim 1,
an electrical power source (30),
a load (40), and
a vehicle electrical system (80) for a vehicle,
wherein
the vehicle electrical system (80) is configured to transmit electrical power from the electrical power source (30) to the load (40), and
the circuit arrangement (5) is configured to reduce a current (I) between the load (40) and the electrical power source (30) by means of a control of the semiconductor switch (20) if a current (I) flowing through the vehicle electrical system (80) corresponds to an overcurrent.

11. The circuit arrangement (5) according to claim 1, wherein the gate resistor (RG) is connected to the limiting resistor (RB).

12. The circuit arrangement (5) according to claim 11, wherein the circuit arrangement (5) comprises a diode (D3), and wherein the gate resistor (RG) is connected to the limiting resistor (RB) via the diode (D3).

13. A circuit arrangement (5) for current limiting, the circuit comprising:
an inductor (L),
a limiting resistor (RB),
a gate resistor (RG),
a current limiting control circuit (10),
a semiconductor switch (20), and
a gate driver (25),
wherein
an output terminal (12) of the current limiting control circuit (10) is connected to a control input (22) of the semiconductor switch (20) via the limiting resistor (RB), wherein the output terminal (12) is connected between the control input (22) of the semiconductor switch (20) and the gate resistor (RG),
the gate driver (25) is connected via the gate resistor (RG) to the control input (22) of the semiconductor switch (20) and to the limiting resistor (RB) and is configured to control the semiconductor switch (20) to open and close,
the current limiting control circuit (10) is configured to change an output impedance of the current limiting control circuit (10) at the output terminal (12) in order to control the semiconductor switch (20),
the semiconductor switch (20) is configured to set a current (I) in a circuit between an electrical power source (30) and a load (40) as a function of a control by the current limiting control circuit (10),
the inductor (L) is configured to be directly or indirectly connected to a terminal (32) of the electrical power source (30) via a first terminal (L1) and directly or indirectly connected to a terminal (42) of the load (40) via a second terminal (L2),
a first input terminal (14) of the current limiting control circuit (10) is electrically connected to the first terminal (L1) of the inductor (L) and a second input terminal (16) of the current limiting control circuit (10) is electrically connected to the second terminal (L2) of the inductor (L), and
the current limiting control circuit (10) is configured to detect an overcurrent-related voltage drop (VL) of the inductor (L) and in response reduce its output impedance in order to thus increase an output impedance of the semiconductor switch (20) on the basis of a voltage drop across the limiting resistor (RB), so that the increased output impedance in the semiconductor switch (20) counteracts the overcurrent; and
wherein the circuit arrangement (5) is configured to subject, prior to processing by the current limiting control circuit (10), a signal representing the voltage drop (VL) across the inductor (L) to low-pass filtering by means of a low-pass filter (50), which is designed to smooth interference signals acting on the circuit.

14. A circuit arrangement (5) for current limiting, the circuit comprising:
an inductor (L),
a limiting resistor (RB),
a gate resistor (RG),
a current limiting control circuit (10),
a discharge resistor (RD),
a low pass filter (50),
a semiconductor switch (20), and
a gate driver (25),
wherein
an output terminal (12) of the current limiting control circuit (10) is connected to a control input (22) of the semiconductor switch (20) via the limiting resistor (RB), wherein the output terminal (12) is connected between the control input (22) of the semiconductor switch (20) and the gate resistor (RG), the gate driver (25) is connected via the gate resistor (RG) to the control input (22) of the semiconductor switch (20) and to the limiting resistor (RB) and is configured to control the semiconductor switch (20) to open and close, the current limiting control circuit (10) is configured to change an output impedance of the current limiting control circuit (10) at the output terminal (12) in order to control the semiconductor switch (20), the semiconductor switch (20) is configured to set a current (I) in a circuit between an electrical power source (30) and a load (40) as a function of a control by the current limiting control circuit (10), the inductor (L) is configured to be directly or indirectly connected to a terminal (32) of the electrical power source (30) via a first terminal (L1) and directly or indirectly connected to a terminal (42) of the load (40) via a second terminal (L2), a first input terminal (14) of the current limiting control circuit (10) is electrically connected to the first terminal (L1) of the inductor (L) and a second input terminal (16) of the current limiting control circuit (10) is electrically connected to the second terminal (L2) of the inductor (L), the current limiting control circuit (10) is configured to detect an overcurrent-related voltage drop (VL) of the inductor (L) and in response reduce its output impedance in order to thus increase an output impedance of the semiconductor switch (20) on the basis of a voltage drop across the limiting resistor (RB), so that the increased output impedance in the semiconductor switch (20) counteracts the overcurrent, and the discharge resistor (RD) is connected in parallel with a capacitor (C) of the RC low-pass filter and is defined as a function of a desired duration of the current limiting between the power source (30) and the load (40).

\* \* \* \* \*